US012104758B1

(12) United States Patent
Zhong

(10) Patent No.: US 12,104,758 B1
(45) Date of Patent: Oct. 1, 2024

(54) FLEXIBLE LOW-VOLTAGE RAIL LIGHTING SYSTEM

(71) Applicant: VANDOLITE CO., LIMITED, Zhongshan (CN)

(72) Inventor: Weican Zhong, Shenzhen (CN)

(73) Assignee: VANDOLITE CO., LIMITED, Zhongshan (CN)

( * ) Notice: Subject to any disclaimer, the term of this patent is extended or adjusted under 35 U.S.C. 154(b) by 0 days.

(21) Appl. No.: 18/418,232

(22) Filed: Jan. 20, 2024

(30) Foreign Application Priority Data

Sep. 21, 2023 (CN) ......................... 202311220245.0

(51) Int. Cl.
*F21S 4/22* (2016.01)
*F21V 21/005* (2006.01)
*F21V 23/02* (2006.01)
*F21Y 105/16* (2016.01)

(52) U.S. Cl.
CPC .............. *F21S 4/22* (2016.01); *F21V 21/005* (2013.01); *F21V 23/023* (2013.01); *F21Y 2105/16* (2016.08)

(58) Field of Classification Search
CPC ......... F21S 4/22; F21V 21/005; F21V 23/023
See application file for complete search history.

(56) References Cited

U.S. PATENT DOCUMENTS 11,098,887 B1 * 8/2021 Irons ......................... F21S 4/22

FOREIGN PATENT DOCUMENTS

WO WO-2023012507 A1 * 2/2023 ............ F21V 15/013

* cited by examiner

*Primary Examiner* — Karabi Guharay
(74) *Attorney, Agent, or Firm* — Jeenam Park

(57) ABSTRACT

The disclosure relates to a field of flexible low-voltage rail lighting system. It is provided with the mounting shell and flat conductor. The mounting shell is provided with the flat conductor inside and the lighting mechanism is installed between the mounting shell and the flat conductor. The lighting mechanism comprises the first lateral plate, second lateral plate, support layer and lamp film. Wherein, the first lateral plate and the second lateral plate are fixed on one end of mounting shell, respectively, there is a supporting layer fixed on both ends inside, and its bottom is fixed with lamp chips. The lamp piece is connected with the flat conductor, the lighting fixture could be mounted at any position on the flat conductor and the flat conductor is fixed more firmly on the mounting shell to prevent it from falling.

6 Claims, 12 Drawing Sheets

FLEXIBLE LOW-VOLTAGE RAIL LIGHTING SYSTEM

CROSS-REFERENCE TO RELATED APPLICATIONS

This application claims priority to Chinese Patent Application No. 202311220245.0, filed on Sep. 21, 2023, which is hereby incorporated by reference in its entirety.

TECHNICAL FIELD

The disclosure relates to a lighting structure technology, in particular to the flexible low-voltage rail lighting system.

BACKGROUND

In the rail lighting system, the aluminum profile is mainly adopted as the material of rail. Its mounting mode and applied field are largely affected by the materials and it could not be bent for modeling freely. The disclosure provides a flexible rail lighting system. The guide rail is made of the flexible materials and the lighting fixtures can be installed at any position on flexible rails, achieving dual degrees of freedom for rail and lamp mounting;

The lighting fixture shall be powered and there are two connecting modes. Firstly, the rail lighting fixture is connected by the metal guide rail, and the lighting fixture is powered by the contact between copper sheets and copper bars in the rail; the non-rail lighting fixture is conducted by the wires. In terms of the power supply, the insulation layer is stripped off at the end of wire to connect for power supply;

To sum up, the existing technologies have the technical problems below. For the conduction of guide rail, the lighting fixture could be mounted anywhere on the rail, but it is mainly made of the aluminum materials, which is hard to be bent with heavy weight and poor freedom of mounting. The wires could be bent and mounted, but it could be connected to the lighting fixture at the end of wires only and it could not be mounted anywhere. Hence, we propose a flexible low-voltage rail lighting system.

SUMMARY

The disclosure is aimed at providing a flexible low-voltage rail lighting system to solve the issues raised in the background technology mentioned above.

To solve the technical problems herein, the disclosure adopts the following technical solution:

A flexible low-voltage rail lighting system comprises the mounting shell and flat conductor. The mounting shell is provided with the flat conductor inside and the lighting mechanism is mounted between the mounting shell and the flat conductor. The said mounting shell comprises the first lateral plate, the second lateral plate, the supporting layer and the lamp film. One end of the mounting shell is fixed with the first lateral plate and another end of the mounting shell is fixed with the second lateral plate. Two sides in the mounting shell are fixed with one supporting layer, whose bottom is fixed with the lamp film. The lamp film is assembled and connected to a flat conductor, and a transparent plate is fixed at the bottom of the mounting shell.

Preferentially, one end on the top of the supporting layer is fixed with the fixed base and the fixed base is fixed with multiple conductive contacts inside. The bottom of multiple conductive contacts penetrates through the support layer and come into contact with the lamp film. The connecting mechanism is mounted between the said fixed base and the flat conductor, and it is used to connect the conductive contact and the flat conductor.

Preferentially, the connecting mechanism comprises the guide component and the buckling component. The mounting shell is provided with the guide component inside and the guide component is mounted with the buckling component. The buckling component is used to buckle the flat conductor into the mounting shell.

Preferentially, the guide component comprises the power supply case, matching groove, connecting wrench, sliding groove, clamp and first connecting spring. One end of the top of the said mounting shell has the plug interface corresponding to the position of the power supply case. The plug interface is slidably connected to the power supply case, and a matching groove is provided on the inner side of the power supply case. One connecting wrench is fixed on both sides in the matching groove through bolts, and the connecting wrench has the sliding groove inside and the sliding groove is connected to the clamp inside smoothly. One end of the said clamp is fixed with the first connecting spring and one end of first connecting spring is fixed with the sliding groove.

Preferentially, the buckling component comprises the auxiliary hook, side groove, fixed hook, main hanging piece, first matching hook, hollow mesh, top groove, connecting seat, conductive disc, bottom plate and top plate. The top of the supporting layer is fixed with a sealing block at a position corresponding to the fixed base, and the sealing block is fixed with the auxiliary hook at one end close to the fixed base. The said power supply case is provided with the side groove at both sides, and the fixing hook is mounted at one side in the side groove. The top of the power supply case is provided with a main hanging part, and the four end corners at the bottom of the main hanging piece are all integrally fixed with a first matching hook, whose bottom is closely connected to the fixing hook. The bottom of the main hanging part is fixed with a hollow mesh at a position that deviates from the first fitting hook, and the flat conductor is located in the area between the main hanging part and the hollow mesh and is in contact with the main hanging part and the hollow mesh. The top of the power supply case has the top groove, which bottom is fixed with the bottom plate. The top of the bottom plate is fixed with top plate. The top plate transitions and fits with the top groove, and the inner side of the connecting seat is slidably connected to a conductive plate. One end of the conductive plate is closely contacted with the bottom plate and the other end is closely connected to the conductive contact. The top of the top plate is uniformly equipped with four sets of puncture copper needles, and the internal circuit of the flat conductor is composed of four independent copper wires. The puncture copper needle corresponds to the copper wire one by one.

Preferentially, the mounting shell is provided with the auxiliary mechanism inside and the auxiliary mechanism is used for auxiliary fixation of flat conductor.

Preferentially, the auxiliary mechanism comprises the guide holder, the second connecting spring, matching frame, trapezoidal block auxiliary hanger, and the second matching hook. The guide holder is mounted on the top of the supporting layer and near the mounting shell. One end of the guide holder is fixed with the second connecting spring and one end of the second connecting spring is fixed with the matching frame The matching frame is slidably connected to the inner side of the guide holder, and two sides at one end is fixed with the trapezoidal block. The first lateral plate has the rectangular groove inside. The end of the matching frame that is far away from the second connecting spring is slidably connected to a rectangular groove, and the top of the mounting shell is slidably connected to an auxiliary hanger at a position corresponding to the matching frame. Both ends at the bottom of the auxiliary hanger are integrally fixed with a second matching hook, which corresponds to the trapezoidal block.

It could be observed without doubt that the above technical solution applied could solve the technical issues that this application aims to solve.

At the same time, the disclosure shall at least have the following beneficial effects through above technical solution:

1. Through the structural design of the lighting mechanism and connecting mechanism, the lighting fixture could be installed at any position on the flat conductor, which improves the working efficiency and the flexibility of the device.

2. Through the structure design of the auxiliary mechanism, the flat conductor is fixed more firmly on the mounting shell to prevent it from falling off from inside of the mounting shell.

BRIEF DESCRIPTION OF DRAWINGS

In order to further explain the embodiments of the disclosure or the technical schemes in the prior art, the drawings to be used in the embodiments are outlined below. It is obvious that the drawings described below are only some embodiments of the disclosure and those skilled in the art can get other drawings based on them without creative contributions.

Figure 1:
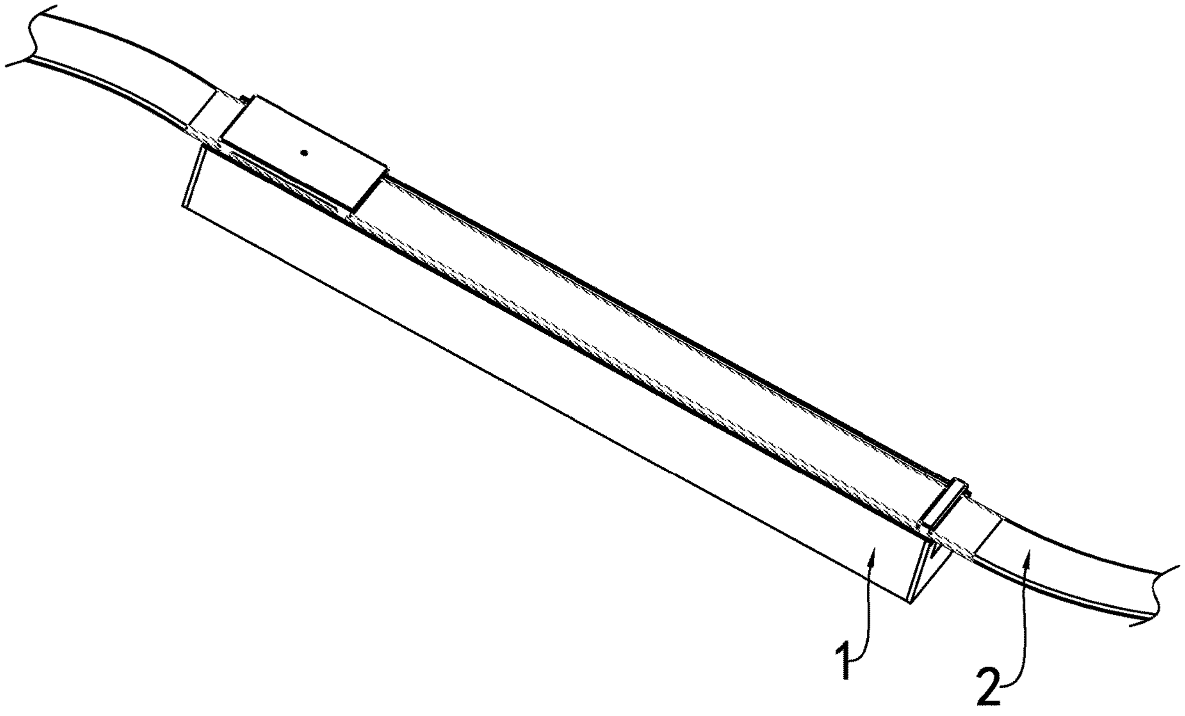
FIG. 1 is structural schematic diagram of the disclosure.
Figure 2:
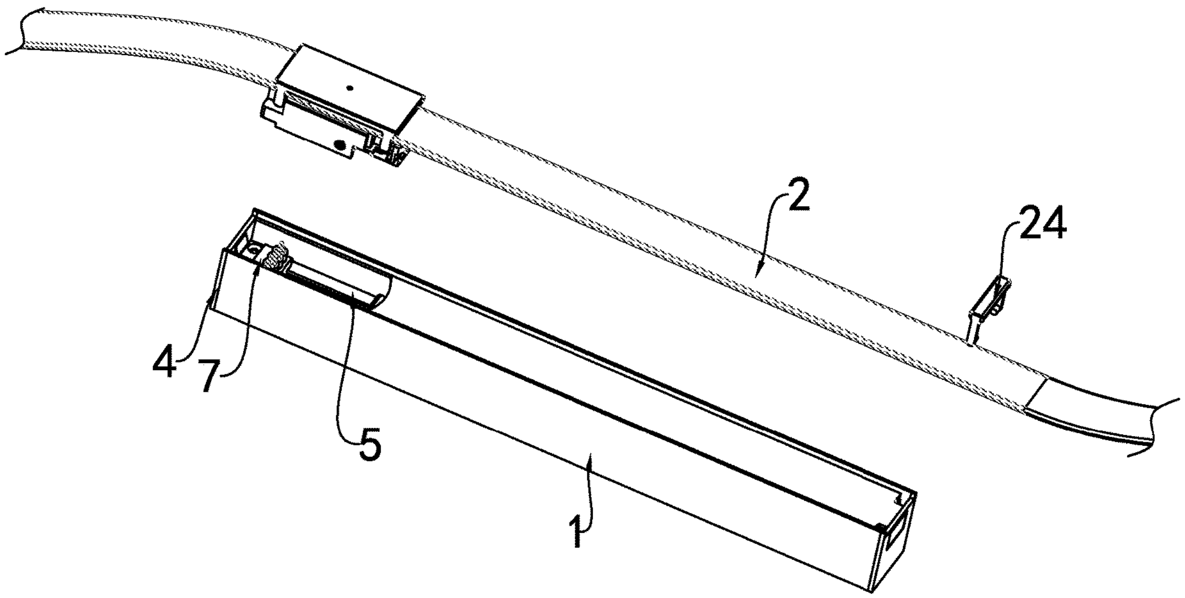
FIG. 2 is the schematic diagram of the connecting structure of mounting shell and supporting layer of the disclosure.
Figure 3:
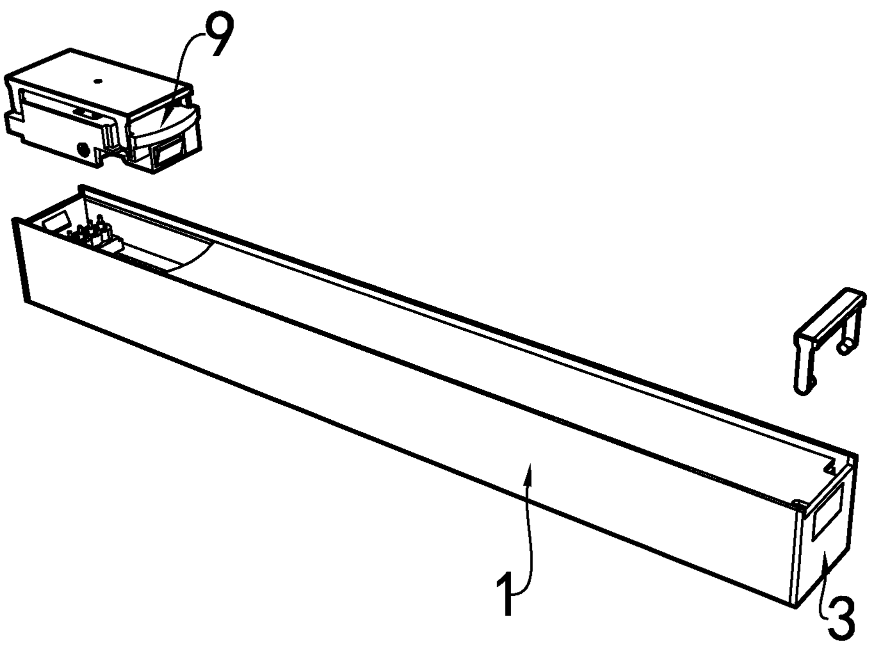
FIG. 3 is the schematic diagram of the connecting structure of mounting shell and first lateral plate of the disclosure.
Figure 4:
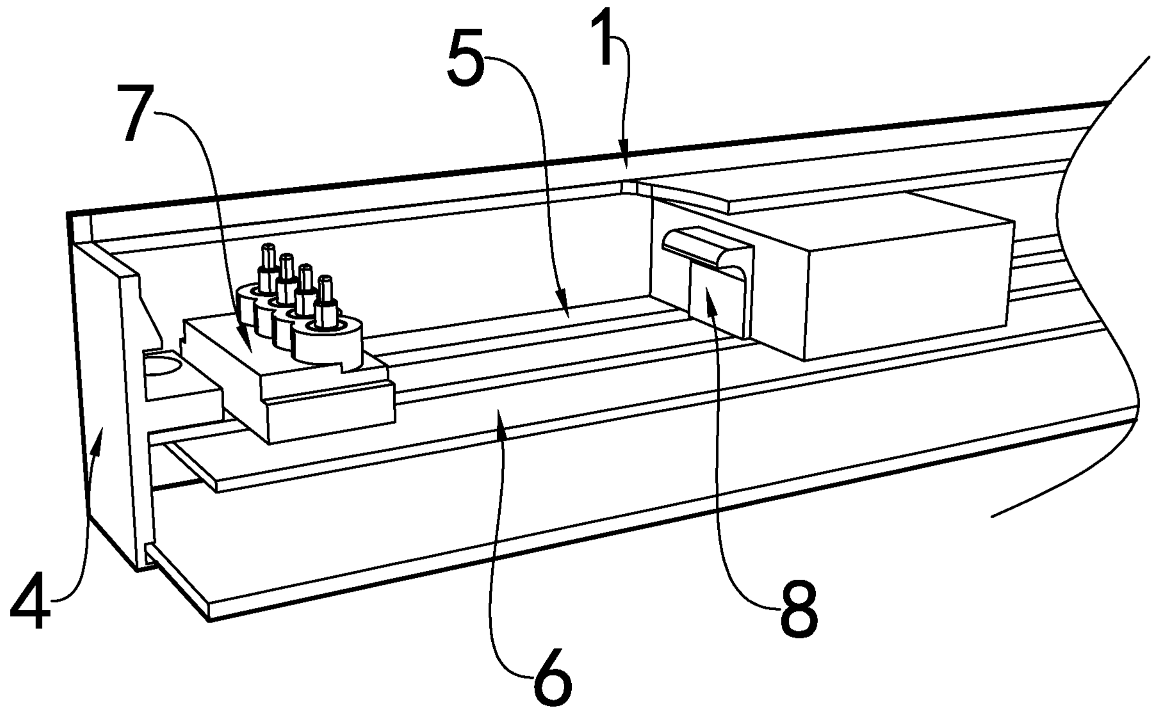
FIG. 4 is the schematic diagram of the sectioning structure of mounting shell in the disclosure.
Figure 5:
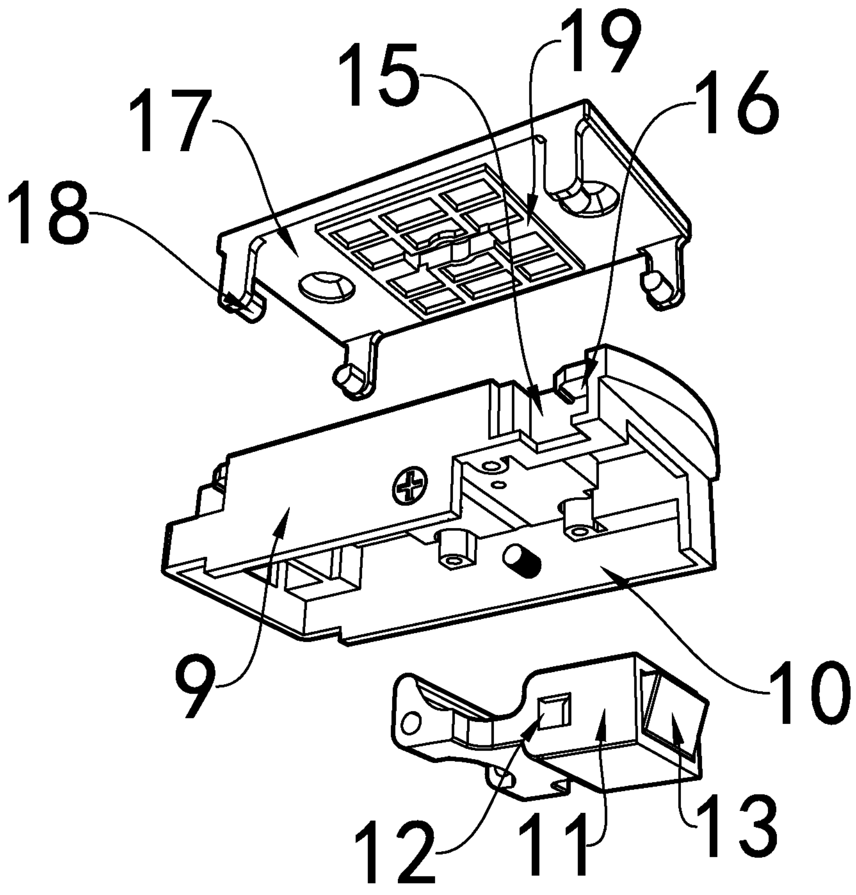
FIG. 5 is the schematic diagram of connecting structure of the main hanging part and hollow mesh in the disclosure.
Figure 6:
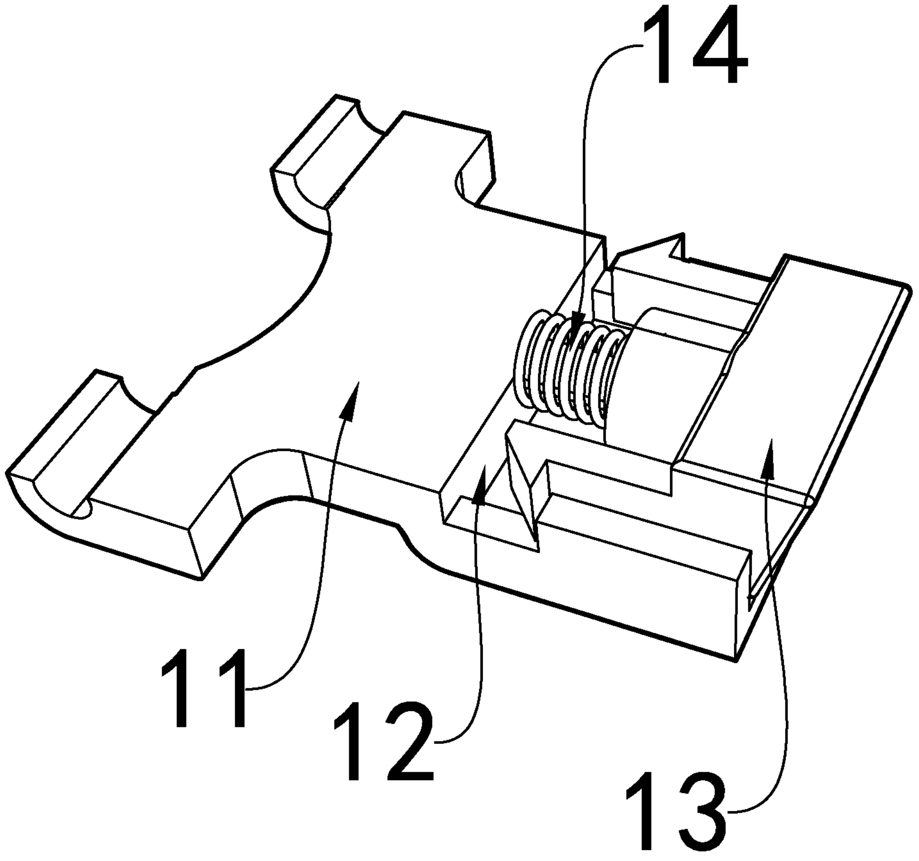
FIG. 6 is the schematic diagram of the sectioning structure of connecting wrench in the disclosure.
Figure 7:
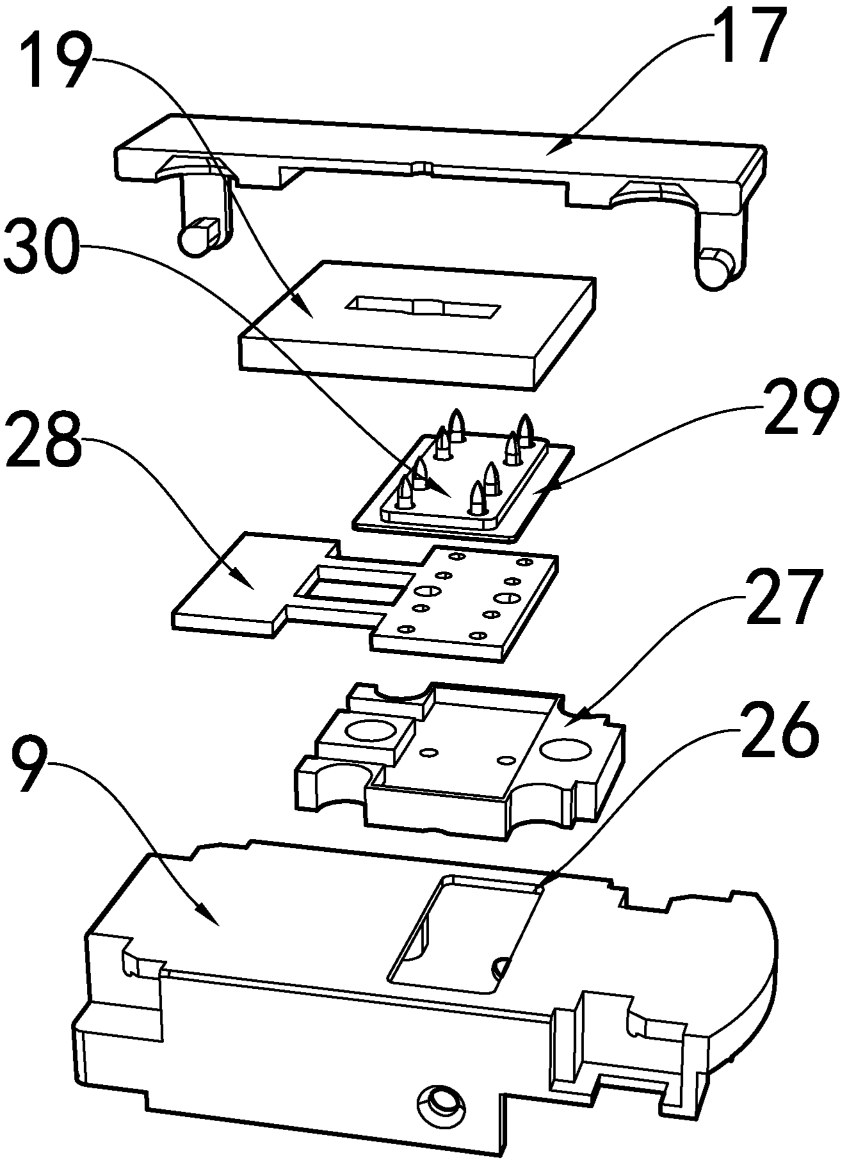
FIG. 7 is the schematic diagram of the sectioning structure of main hanging part in the disclosure.
Figure 8:
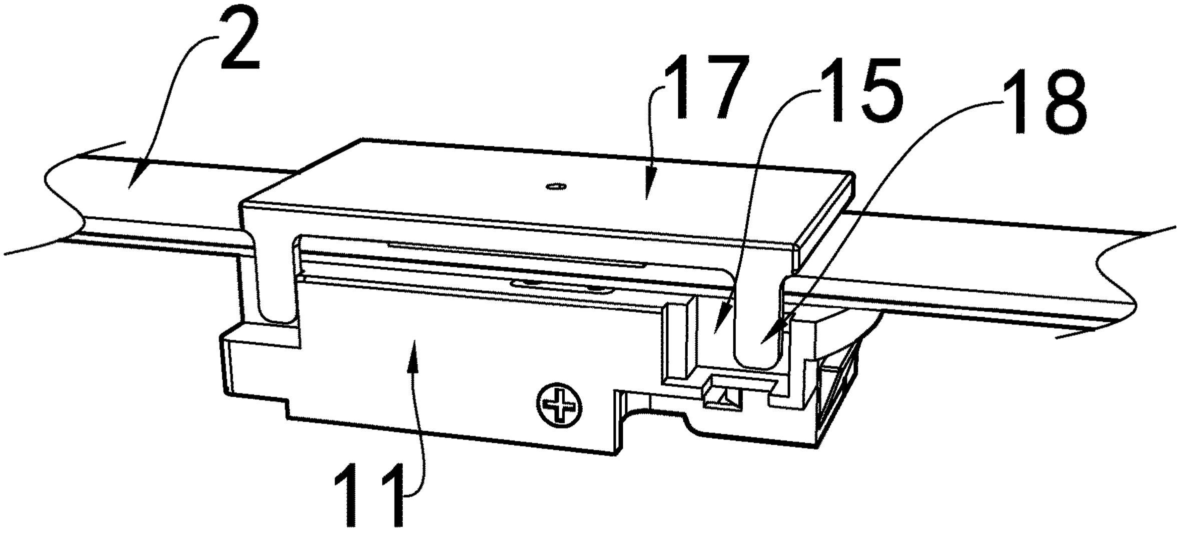
FIG. 8 is the schematic diagram of connecting structure of flat conductor and main hanging part in the disclosure.

In the attached diagram, the list of components represented by each label is as follows:

Wherein, 1. mounting shell; 2. flat conductor; 3. first lateral plate; 4. second lateral plate; 5. supporting layer; 6. Lamp film; 7. fixed base; 8. auxiliary hook; 9. power supply case; 10. matching groove; 11. connecting wrench; 12. Sliding groove; 13. clamp; 14. First connecting spring; 15. side groove; 16. Fixed hook; 17. main hanging part; 18. first fitting hook; 19. hollow mesh; 20. guide holder; 21. second connecting spring; 22. matching frame; 23. trapezoidal block; 24. auxiliary hanger; 25. Second matching hook; 26. Top groove; 27. Connecting seat; 28. Conductive plate; 29. Base plate; 30. Top plate.

DESCRIPTION OF EMBODIMENTS

In order to make the purposes, technical schemes and advantages of the disclosure more comprehensible, the disclosure will be further described in details below with reference to the attached Figures and embodiments. It should be pointed out that the specific embodiments described herein are only used to elaborate the disclosure, and are not intended to define the disclosure.

Embodiment 1

With reference of FIG. 1-8, a flexible low-voltage rail lighting system comprises the mounting shell 1 and flat conductor 2, the mounting shell 1 is provided with the flat conductor 2 inside and the lighting mechanism is mounted between the mounting shell 1 and the flat conductor 2, the said mounting shell comprises the first lateral plate 3, the second lateral plate 4, the supporting layer 5 and the lamp film 6, one end of the mounting shell 1 is fixed with the first lateral plate 3 and another end of the mounting shell is fixed with the second lateral plate 4, two sides in the mounting shell 1 is fixed with one supporting layer 5, whose bottom is fixed with the lamp film 6, the lamp film 6 is assembled and connected to a flat conductor 2 and a transparent plate is fixed at the bottom of the mounting shell 1.

Figure 11:
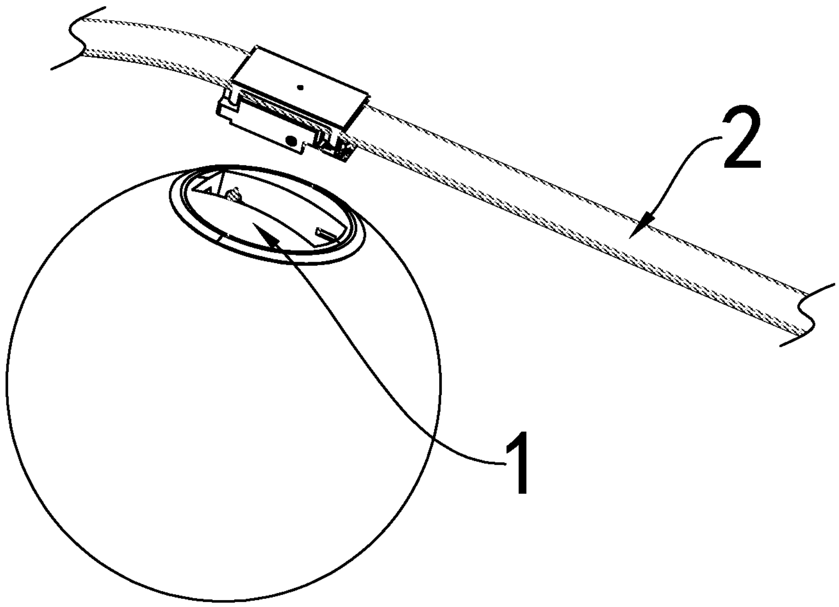
FIG. 11 is the schematic diagram of connecting structure of the mounting shell and the spherical lampshade in the existing technology.
Figure 12:
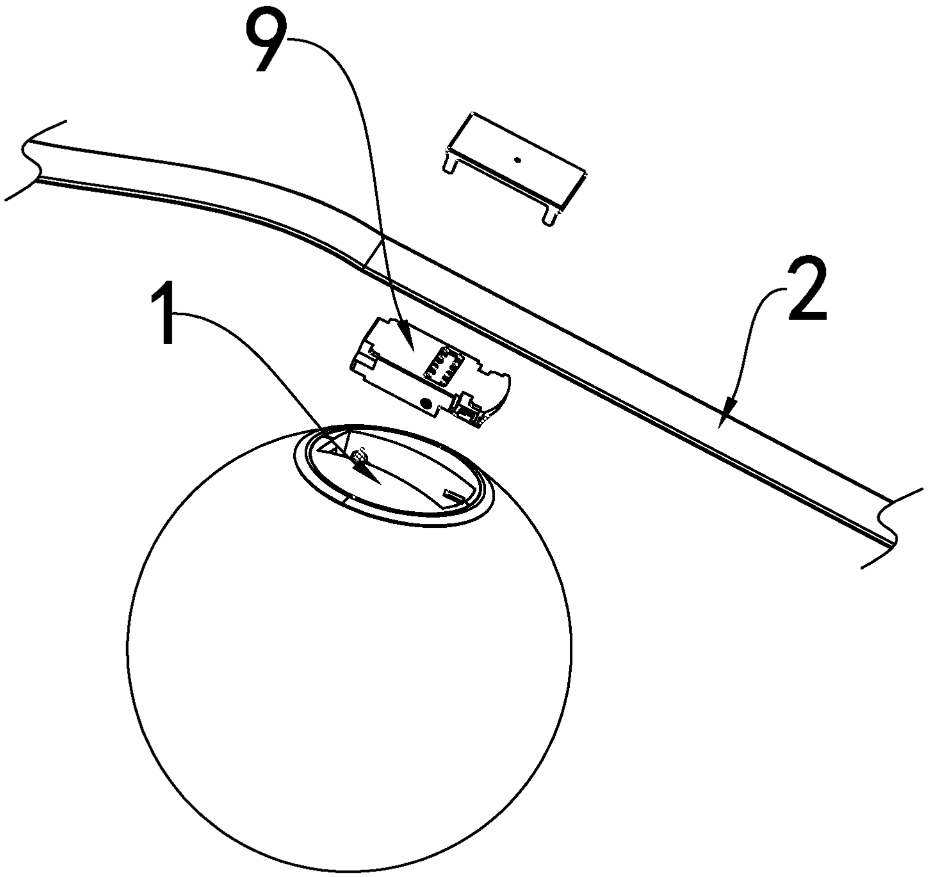
FIG. 12 is the structural schematic diagram of spherical lampshade in the existing technology.

As shown in FIG. 11 and FIG. 12, the spherical lampshade is common in the existing technologies, and it could be normally applied when the mounting shell 1 is mounted in the spherical lampshade.

One end of the top of the supporting layer 5 is fixed with a fixed base 7 and multiple conductive contacts are uniformly distributed and fixed inside the fixed base 7, the bottom of multiple conductive contacts penetrates through the support layer 5 and contacts with the lamp film 6, the connecting mechanism is mounted between the said fixed base 7 and the flat conductor 2, it is used to connect the conductive contact and the flat conductor 2, the electric contact can achieve conductivity, making it easy to realize the conduction on the lamp film 6.

Preferentially, the connecting mechanism comprises the guide component and the buckling component, the mounting shell 1 is provided with the guide component inside and the guide component is mounted with the buckling component, the buckling component is used to buckle the flat conductor 2 into the mounting shell 1.

The guide component comprises the power supply case 9, matching groove 10, connecting wrench 11, sliding groove 12, clamp 13 and first connecting spring 14, one end of the top of the said mounting shell 1 has the plug interface corresponding to the position of the power supply case 9, the plug interface is slidably connected to the power supply case 9 and a matching groove 10 is provided on the inner side of the power supply case 9, one connecting wrench 11 is fixed on both sides in the matching groove 10 through bolts, the connecting wrench 11 has the sliding groove 12 inside and the sliding groove 12 is connected to the clamp 13 inside smoothly, one end of the said clamp 13 is fixed with the first connecting spring 14 and one end of first connecting spring 14 is fixed with the sliding groove 12, both ends of the clamp 13 are integrally fixed with straight hooks, which are connected to both ends of the sliding groove 12.

The buckling component comprises the auxiliary hook 8, side groove 15, fixed hook 16, main hanging piece 17, first matching hook 18, hollow mesh 19, top groove 26, connecting seat 27, conductive disc 28, bottom plate 29 and top plate 30, the top of the supporting layer 5 is fixed with a sealing block at a position corresponding to the fixed base 7 and the sealing block is fixed with the auxiliary hook 8 at one end close to the fixed base 7, the said power supply case 9 is provided with the side groove 15 at both sides and the fixing hook 16 is mounted at one side in the side groove 15, the top of the power supply case 9 is provided with a main hanging part 17 and four end corners at the bottom of the main hanging piece 17 are all integrally fixed with a first matching hook 18, whose bottom is closely connected to the fixing hook 16, the bottom of the main hanging part 17 is fixed with a hollow mesh 19 at a position that deviates from the first fitting hook 18, the flat conductor 2 is located in the area between main hanging part 17 and hollow mesh 19 and is in contact with the main hanging part 17 and the hollow mesh 19, the top of the power supply case 9 has the top groove 26, which bottom is fixed with the bottom plate 29, the top of the bottom plate 29 is fixed with top plate 30, the top plate 30 transitions and fits with the top groove 26 and the inner side of the connecting seat 27 is slidably connected to a conductive plate 28, one end of the conductive plate 28 is closely contacted with the bottom plate 29 and the other end is closely connected to the conductive contact, the top of the top plate 30 is uniformly equipped with four sets of puncture copper needles and the internal circuit of the flat conductor 2 is composed of four independent copper wires, the puncture copper needle corresponds to the copper wire one by one, by setting the hollow mesh 19, the puncture copper needle provides a certain buffer space when passing through the insulation layer on the outer side of the flat conductor 2 and contacting the internal copper wire of the flat conductor 2, which leads to the less resistance to the puncture copper needle.

Embodiment 2

Figure 9:
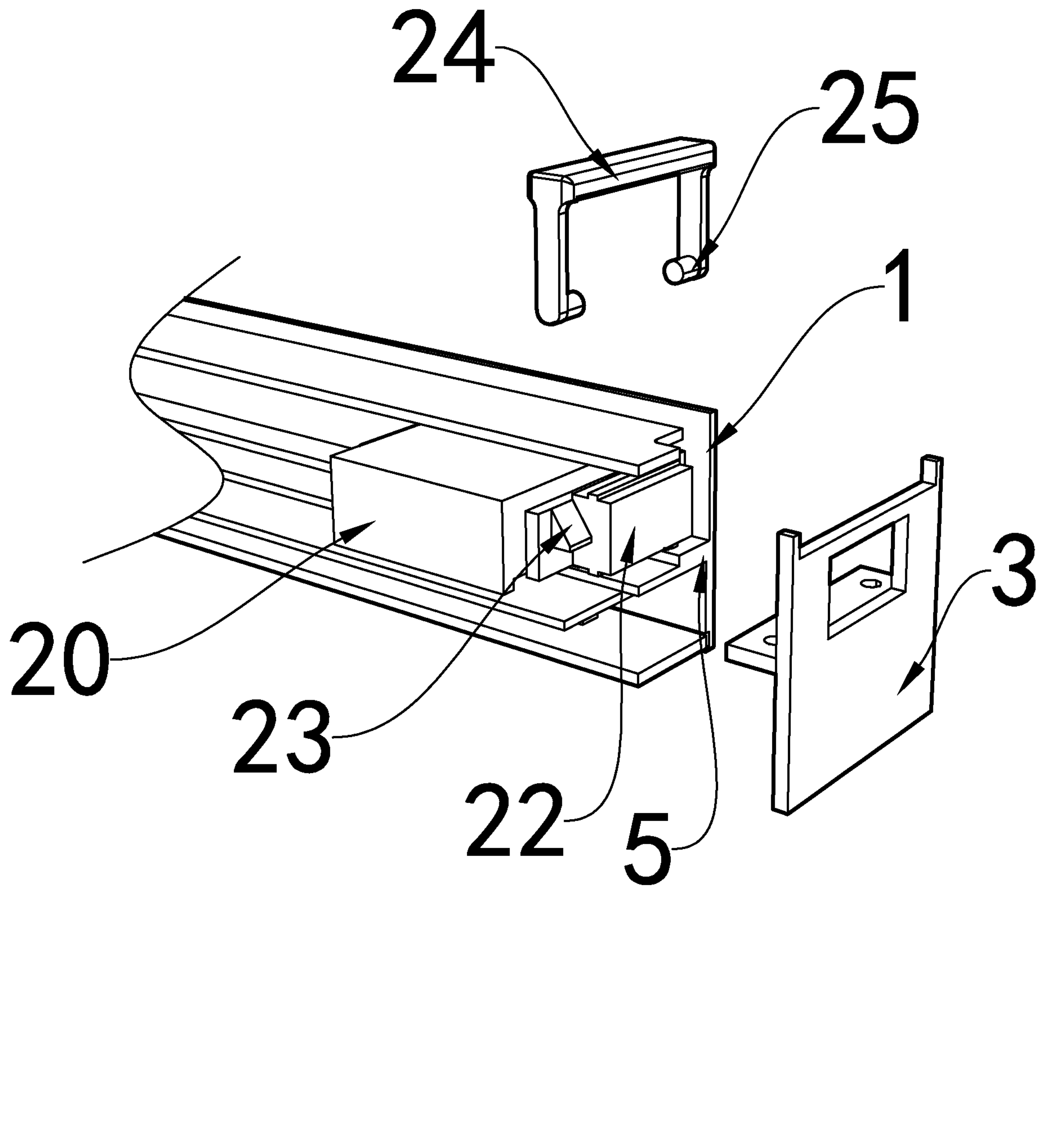
FIG. 9 is the schematic diagram of connecting structure of auxiliary hanger and the s second matching hook in the disclosure.
Figure 10:
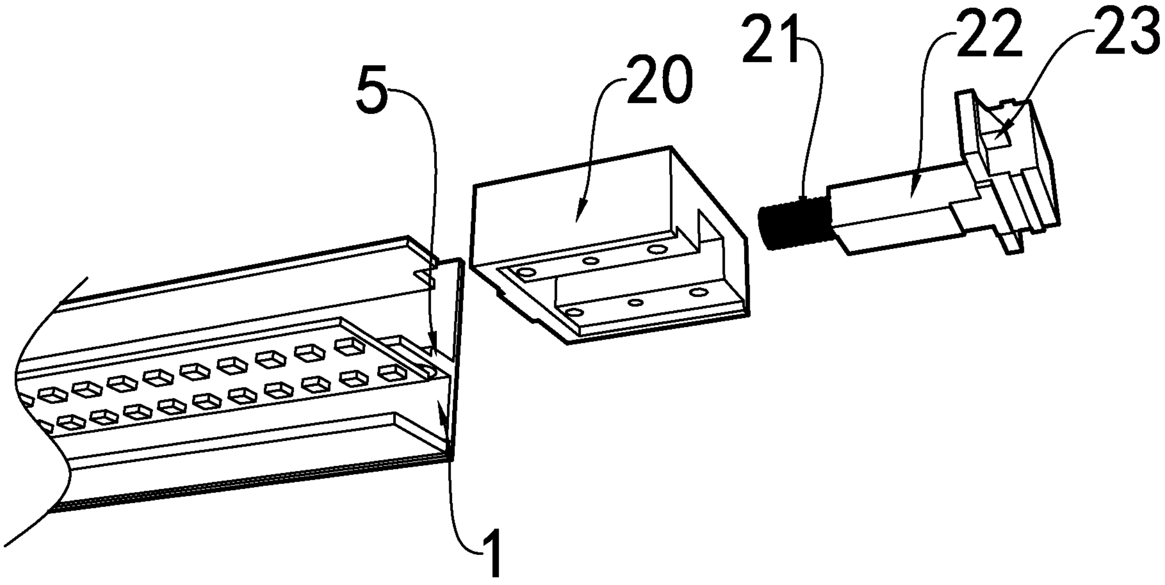
FIG. 10 is the schematic diagram of connecting structure of guide holder and matching frame in the disclosure.

The embodiment 1 is further optimized, specifically, the mounting shell 1 is provided with the auxiliary mechanism inside and the auxiliary mechanism is used for auxiliary fixation of flat conductor 2, as shown in FIG. 9-10.

The auxiliary mechanism comprises the guide holder 20, the second connecting spring 21, matching frame 22, trapezoidal block 23, auxiliary hanger 24 and the second matching hook 25, the guide holder 20 is mounted on the top of the supporting layer 5 and near the mounting shell 1, one end of the guide holder 20 is fixed with the second connecting spring 21 and one end of the second connecting spring 21 is fixed with the matching frame 22, the matching frame 22 is slidably connected to the inner side of the guide holder 20 and two sides at one end is fixed with the trapezoidal block 23, the first lateral plate 3 has the rectangular groove inside, the end of the matching frame 22 that is far away from the second connecting spring 21 is slidably connected to a rectangular groove and the top of the mounting shell 1 is slidably connected to an auxiliary hanger 2) at a position corresponding to the matching frame 22, both ends at the bottom of the auxiliary hanger 24 are integrally fixed with a second matching hook 25, which corresponds to the trapezoidal block 23, when the auxiliary fixation is required for the flat conductor 2, press the auxiliary hanger 24, so as to drive the second matching hook 25 into the interior of the mounting shell 1, when the second matching hook 25 contacts the trapezoidal block 23, the second matching hook 25 pushes the trapezoidal block 23 along the inclined surface at the top of the trapezoidal block 23 to move, causing that trapezoidal block 23 drives the matching frame 22 to move along the inner side of the guide holder 20, meanwhile, the second connecting spring is compressed and contracted until the second matching hook 25 moves to the position below the trapezoidal block 23, then, the stretch generated by the second connecting spring 21 pushes the matching frame 22 and the moving trapezoidal block 23 to reset until the second matching hook 25 is directly below the trapezoidal block 23, forming the limited fixation of the flat conductor 2.

To sum up, it could be understood that:

In terms of the technology, the lighting fixture could be mounted at any place on the rail, but it is mainly made of the aluminum materials, which is hard to bed with heavy weight and poor freedom of mounting. The wires could be bent and mounted, but it could be connected to the lighting fixture at the end of wires only and it could not be mounted at any position; The technical solution in above embodiment is adopted. The realization process of above technical solution:

The electrical components in the device adopt the existing technology and its model is one of them only. The electrical components that can achieve the intended purpose in this device can be applied. Its detailed connection mode is a well-known technology in the field. The working principles and process are mainly introduced without any description on the electric control;

In the application, insert the first fitting hook 18 in the side groove 15 and move the main hanging part 17 horizontally, so that the first fitting hook 18 is hooked with the fixing hook 16. At this time, the hollow mesh 19 press on the flat conductor 2. The position of the puncture copper needle corresponds with the position of the copper wire inside the flat conductor 2 one by one and the copper needle punctures the insulation layer of the flat conductor 2 and then connects with the copper wire for power under the pressure;

Besides, the conductive contact on the fixed base 7 is connected to one end of the conductive plate 28 to form the conductive circuit, powering the lamp film 6 for lighting.

Through above setting, this application could solve above technical problems and realize the following technical effects:

1. Through the structural design of the lighting mechanism and connecting mechanism, the lighting fixture could be installed at any position on the flat conductor 2, which improves the working efficiency and the flexibility of the device.

2. Through the structure design of the auxiliary mechanism, the flat conductor 2 is fixed more firmly on the mounting shell 1 to prevent it from falling off from inside of the mounting shell 1.

In the disclosure, the term “mounting”, “connecting”, “connection” and “fixing” shall be understood broadly unless otherwise specified and limited. For example, the elements can be connected fixedly, detachably or integrally. They can also be connected mechanically, electrically, or the linking can be realized. Besides, the elements can be connected directly, or connected indirectly with medium, or two elements are connected inside or interacted with each other. As to ordinary technical personnel in the field, they can understand the concrete meaning of the said terms in the disclosure in accordance with the specific situations.

Obviously, the embodiments described above are some embodiments in the disclosure, not all of them. The attached drawing gives better embodiments of the disclosure, and it cannot limit the patent scope of the disclosure. The disclosure could be realized in different forms, and these embodiments are provided for thorough and comprehensive understanding on the disclosed contents of the disclosure. Although the disclosure is explained in details with reference to the aforementioned embodiments, the technicians in this field could modify the technical solutions recorded in the aforementioned specific implementation methods, or conduct the equivalent substitution of some technical characteristics. Once the equivalent structure utilizing the disclosure manual and attached drawings is applied to other relevant technical fields directly or indirectly, it is included in the scope of disclosure patent protection.

What is claimed is:

1. A flexible low-voltage rail lighting system comprises a mounting shell (1) and a flat conductor (2), an inner side of the mounting shell (1) is provided with the flat conductor (2) and a lighting mechanism is mounted between the mounting shell (1) and the flat conductor (2), the lighting mechanism comprises a first lateral plate (3), a second lateral plate (4), a supporting layer (5) and a lamp film (6), one end of the mounting shell (1) is fixed with the first lateral plate (3) and another end is fixed with the second lateral plate (4), the mounting shell (1) is fixed with the supporting layer (5) on both sides inside, and a bottom of the supporting layer (5) is fixed with the lamp film (6), the lamp film (6) is connected with the flat conductor (2) and a bottom of the mounting shell (1) is fixed with a transparent plate;

wherein one end of a top of the supporting layer (5) is fixed with a fixed base (7), a connecting mechanism is mounted between the fixed base (7) and the flat conductor (2) and it is configured to connect a conductive contact and the flat conductor (2);

wherein the connecting mechanism comprises a guide component and a buckling component, the mounting shell (1) is provided with the guide component inside and the guide component is mounted with the buckling component, the buckling component is configured to buckle the flat conductor (2) into the mounting shell (1).

2. The flexible low-voltage rail lighting system according to claim 1, wherein multiple conductive contacts are uniformly distributed and fixed inside the fixed base (7), bottoms of the multiple conductive contacts penetrate through the supporting layer (5) and come into contact with the lamp film (6).

3. The flexible low-voltage rail lighting system according to claim 1, wherein the guide component comprises a power supply case (9), a matching groove (10), a connecting wrench (11), a sliding groove (12), a clamp (13) and a first connecting spring (14), one end of a top of the mounting shell (1) has a plug interface corresponding to a position of the power supply case (9), the plug interface is slidably connected to the power supply case (9) and the matching groove (10) is provided on an inner side of the power supply case (9), one connecting wrench (11) is fixed on both sides in the matching groove (10) through bolts and the connecting wrench (11) has the sliding groove (12) inside and the sliding groove (12) is connected to the clamp (13) inside smoothly, one end of the clamp (13) is fixed with the first connecting spring (14) and one end of the first connecting spring (14) is fixed with the sliding groove (12).

4. The flexible low-voltage rail lighting system according to claim 3, wherein the buckling component comprises an auxiliary hook (8), a side groove (15), a fixed hook (16), a main hanging piece (17), a first matching hook (18), a hollow mesh (19), a top groove (26), a connecting seat (27), a conductive disc (28), a bottom plate (29) and a top plate (30), the top of the supporting layer (5) is fixed with a sealing block at a position corresponding to the fixed base (7) and the sealing block is fixed with the auxiliary hook (8) at one end close to the fixed base (7), the power supply case (9) is provided with the side groove (15) at both sides, and the fixed hook (16) is mounted at one side in the side groove (15), a top of the power supply case (9) is provided with the main hanging piece (17) and four end corners at a bottom of the main hanging piece (17) are all integrally fixed with the first matching hook (18), whose bottom is closely connected to the fixed hook (16), the bottom of the main hanging piece (17) is fixed with the hollow mesh (19) at a position that deviates from the first matching hook (18), and the flat conductor (2) is located in an area between the main hanging piece (17) and the hollow mesh (19) and it is in contact with the main hanging piece (17) and the hollow mesh (19), the top of the power supply case (9) has the top groove (26), whose bottom is fixed with the bottom plate (29), a top of the bottom plate (29) is fixed with the top plate (30), the top plate (30) transitions and fits with the top groove (26) and an inner side of the connecting seat (27) is slidably connected to the conductive disc (28), one end of the conductive disc (28) is closely contacted with the bottom plate (29) and the other end is closely connected to the conductive contact, a top of the top plate (30) is uniformly equipped with four sets of puncture copper needles, an internal circuit of the flat conductor (2) is composed of four independent copper wires and the puncture copper needle corresponds to the copper wire one by one.

5. The flexible low-voltage rail lighting system according to claim 1, wherein the mounting shell (1) is provided with an auxiliary mechanism inside and the auxiliary mechanism is used for auxiliary fixation of the flat conductor (2).

6. The flexible low-voltage rail lighting system according to claim 5, wherein the auxiliary mechanism comprises a guide holder (20), a second connecting spring (21), a matching frame (22), a trapezoidal block (23), an auxiliary hanger (24) and a second matching hook (25), the guide holder (20) is mounted on the top of the supporting layer (5) and near the mounting shell (1), one end of the guide holder (20) is fixed with the second connecting spring (21) and one end of the second connecting spring (21) is fixed with the matching frame (22), the matching frame (22) is slidably connected to an inner side of the guide holder (20) and two sides at one end is fixed with the trapezoidal block (23), the first lateral plate (3) has a rectangular groove inside, one end of the matching frame (22) that is far away from the second connecting spring (21) is slidably connected to the rectangular groove, and the top of the mounting shell (1) is slidably connected to the auxiliary hanger (24) at a position corresponding to the matching frame (22), both ends at a bottom of the auxiliary hanger (24) are integrally fixed with the second matching hook (25), which corresponds to the trapezoidal block (23).

* * * * *